E. F. THIEMANN.
MOLDING MACHINE.
APPLICATION FILED AUG. 28, 1911.

1,084,048.

Patented Jan. 13, 1914.

3 SHEETS—SHEET 1.

WITNESSES

INVENTOR.
Ernest F. Thiemann
By Morsell & Caldwell
ATTORNEYS.

E. F. THIEMANN.
MOLDING MACHINE.
APPLICATION FILED AUG. 28, 1911.
1,084,048.
Patented Jan. 13, 1914.
3 SHEETS—SHEET 2.
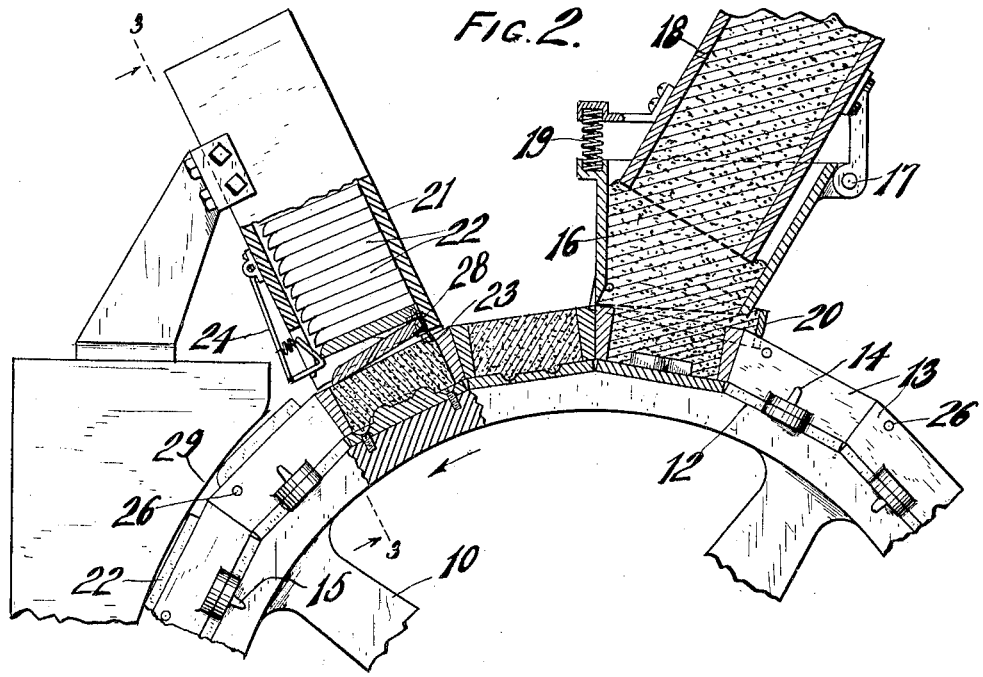
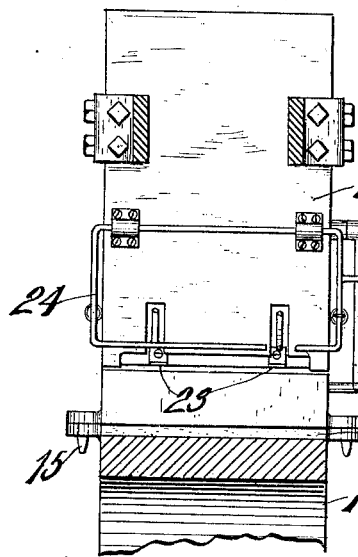
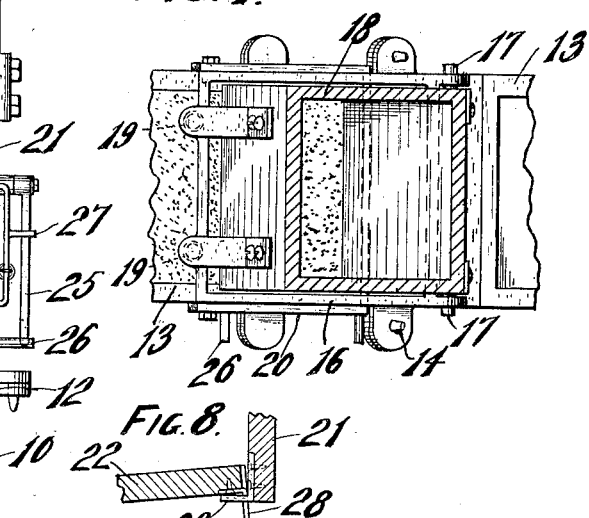
WITNESSES.
INVENTOR.
Ernest F. Thiemann,
By Morsell & Caldwell
ATTORNEYS.

E. F. THIEMANN.
MOLDING MACHINE.
APPLICATION FILED AUG. 28, 1911.
1,084,048.
Patented Jan. 13, 1914.
3 SHEETS—SHEET 3.
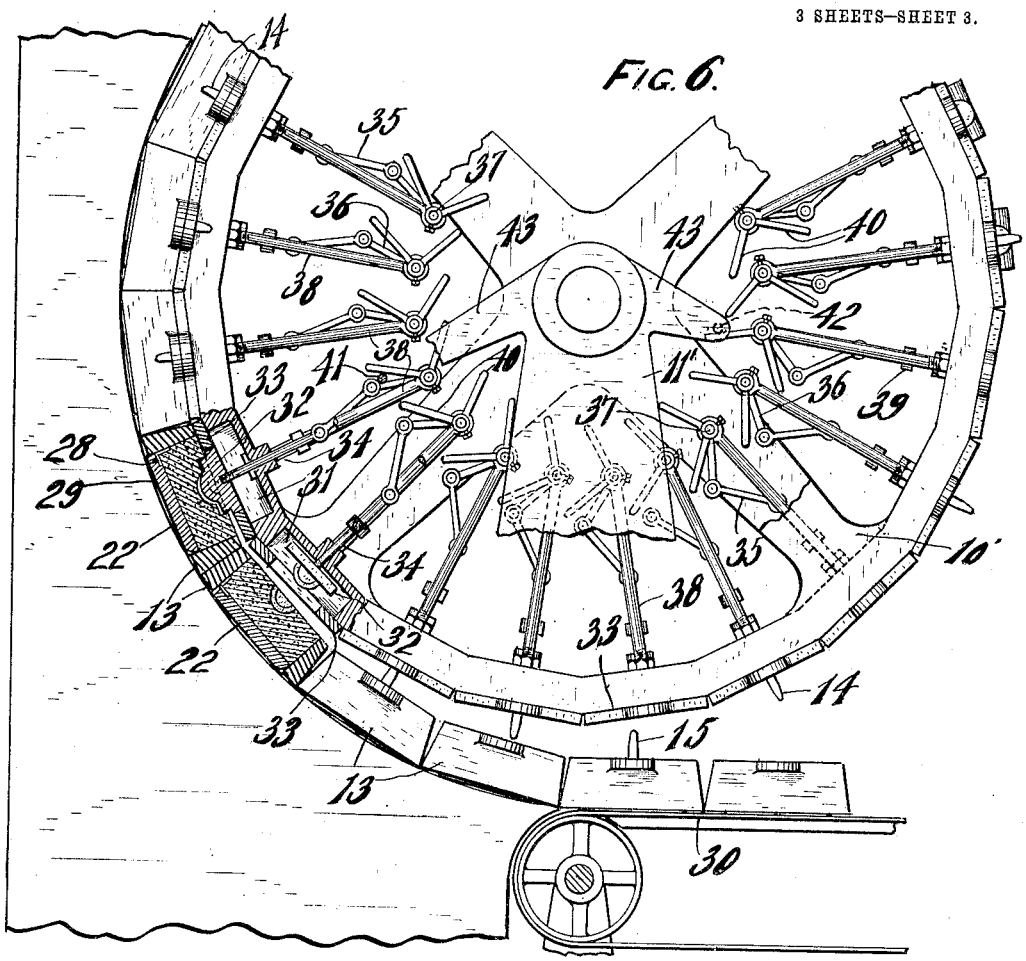
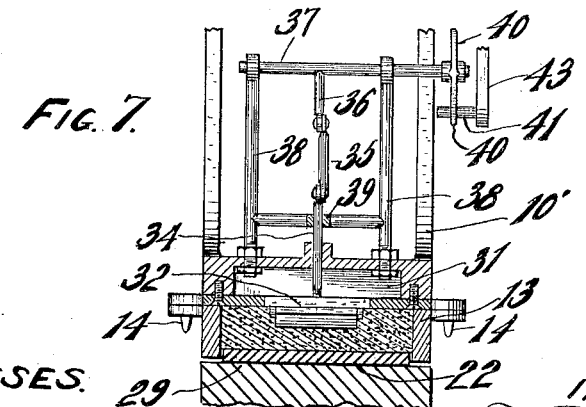

UNITED STATES PATENT OFFICE.

ERNEST F. THIEMANN, OF MILWAUKEE, WISCONSIN.

MOLDING-MACHINE.

1,084,048. Specification of Letters Patent. Patented Jan. 13, 1914.

Application filed August 28, 1911. Serial No. 646,456.

*To all whom it may concern:*

Be it known that I, ERNEST F. THIEMANN, a citizen of the United States, and resident of Milwaukee, in the county of Milwaukee and State of Wisconsin, have invented new and useful Improvements in Molding-Machines, of which the following is a description, reference being had to the accompanying drawings, which are a part of this specification.

This invention has for its object to provide mechanism for automatically preparing molding flasks by filling them with sand around a pattern, supplying them with movable bottoms, compressing the sand against the pattern by means of said bottoms, and stripping or drawing the patterns from the sand.

Another object of this invention is to accomplish the above in a continuously operating mechanism.

With the above and other objects in view the invention consists in the molding machine, as herein claimed, and all equivalents.

Figure 1:
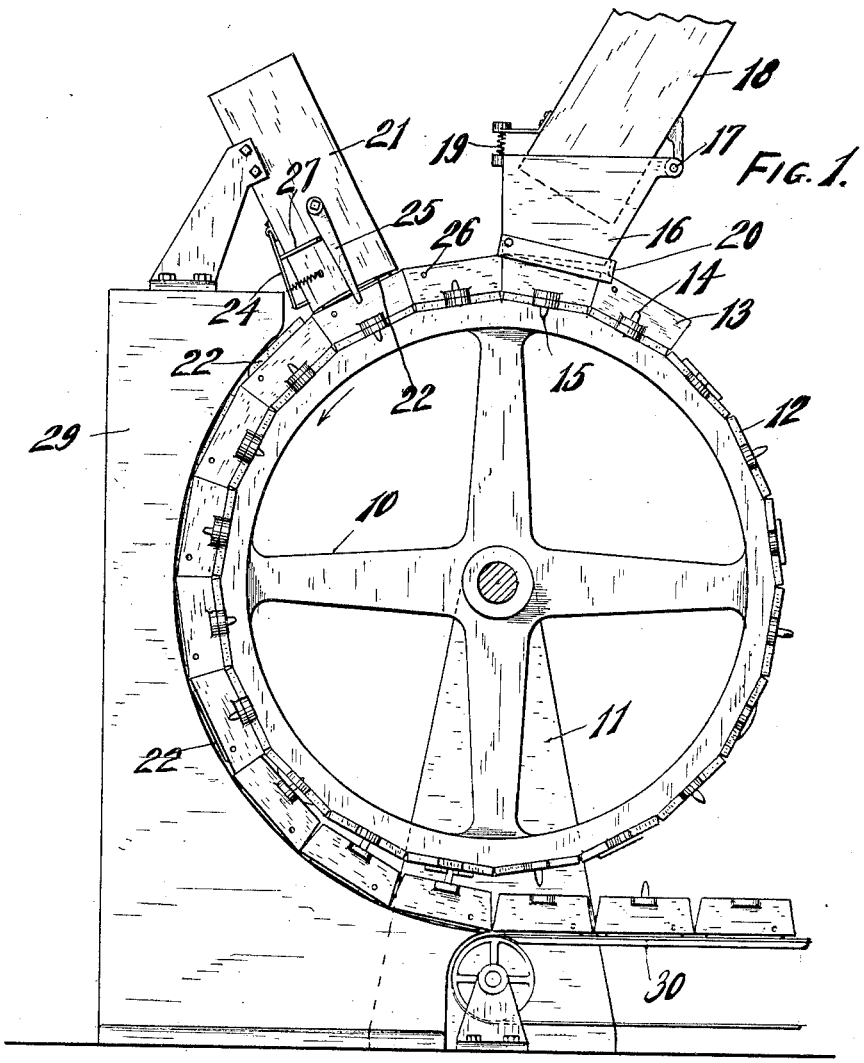
Figure 5:
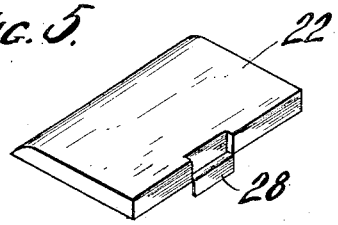

Referring to the accompanying drawings in which like characters of reference indicate the same parts in the different views: Figure 1 is a front elevation of a molding machine constructed in accordance with this invention; Fig. 2 is a sectional detail view of a portion thereof, showing the sand hopper and the hopper for furnishing the flask bottoms; Fig. 3 is a sectional detail view on the plane of line 3—3 of Fig. 2; Fig. 4 is a sectional plan view of the sand hopper; Fig. 5 is a perspective view of one of the movable flask bottoms; Fig. 6 is a sectional detail view of a portion of a molding machine of a modified construction, wherein the patterns are provided with special mechanism for drawing them from the sand; Fig. 7 is a transverse sectional view of a portion thereof; and Fig. 8 is a sectional view showing the engagement of the lowermost bottom plate with lugs at the lower end of the hopper.

In these drawings 10 indicates a drum or wheel which is journaled in standards 11 and is suitably driven in the direction of the arrow of Fig. 1. The drum has pattern plates 12 secured to its periphery, preferably by having them bolted thereto, as shown in Fig. 2. Sections of molding flasks 13 are adapted to be attached to the pattern plates 12 by means of lugs 14 on alternate pattern plates engaging openings in side ears of the flask sections and by means of openings in ears of the intermediate pattern plates engaged by lugs 15 of the flask sections thereof. Thus provision is made for the cope and drag sections of each flask being accommodated on the drum, adjacent to each other. The flask sections, by their flaring shape, have their edges close together when they are mounted on the drum so that the sand from the sand hopper will not fall between them.

The sand hopper 16, in the form of a short funnel, is pivotally mounted at 17 to a stationary spout 18, in which there is a constant supply of molding sand in condition for filling the flask sections. This hopper 16 swings on its pivoted connection 17 so as to ride on the edges of the flask sections as they pass beneath it, and is desirably given a spring pressure to cause it to scrape the sand evenly across the openings of the flask sections by means of a coil spring 19 fitting in spring seats on the hopper and the spout respectively. The spout extends into the hopper a sufficient extent to prevent the sand overflowing the hopper, and a guard 20 pivotally mounted at the scraping edge of the hopper and extending around the opposite edge of the hopper rides on the flask sections and prevents the sand escaping at such opposite edge of the hopper which is spaced from the flask sections. As each flask section travels beneath the sand hopper 16 it is filled with sand around the pattern on the pattern plate 12 and the sand is smoothly scraped across the open end of the flask section by the edge of the hopper which is beveled for that purpose. A tubular hopper 21, fixed in position above the drum 10, is next encountered by the flask sections, and in this hopper is contained a number of bottom plates 22 to be fed singly to the flask sections when they are in proper position to receive them. The column of bottom plates 22 is supported within the hopper 21 by the lowermost bottom plate engaging a pair of inwardly extending lugs 23 on the lower end of the hopper while its opposite edge engages a spring retracted pivoted catch 24 working through an opening in the lower end of the hopper. The lowermost bottom plate is released and dropped onto a flask section, when the latter is in position to receive it, by the pivoted catch 24 being swung outwardly against the action of its spring, and this movement is accomplished by lever 25, fulcrumed on the side of the hopper 21, becoming engaged by a projecting pin 26 on the side of the flask section and causing the catch to swing with it, because of said catch having an extension 27 bearing against the lever, as shown in Figs. 1 and 3. Each of the bottom plates 22 has a metal lug 28 secured to it at its rear edge and the plate is recessed above the lug to receive the lug of the bottom plate above it when they are in column formation in the hopper. This downwardly extending lug 28 falls into the sand of a flask section when the bottom plate beneath is carried out by the preceding flask section, and by coming in engagement with the rear wall of the flask section it is carried along with the drum in position to cover the sand of the flask section.

On leaving the hopper the bottom plate 22 immediately comes into bearing with a stationary cam 29 having a presser face eccentric to the drum and is carried along the surface thereof by the turning motion of the drum. By reason of said presser face being eccentric to the drum the bottom plate is forced inwardly to compress the sand around the pattern. When the flask section reaches the lower part of the drum it is inverted and rests upon the cam 29, which recedes from the drum and thus permits the flask section to become disconnected from the drum, the patterns being drawn therefrom. When the flask sections are disengaged from the drum they pass onto a conveyer belt 30, which carries them away from the machine. By this means the empty flask sections are fed to the drum and placed in position thereon in any desirable manner, and in traveling with the drum they are filled with sand, then receive a bottom plate, and then have the sand compressed around the pattern by said bottom plate acting upon the stationary cam and finally have the pattern withdrawn and become disconnected from the drum and deposited on the discharge conveyer ready to be set up.

It is obvious that the invention is not confined to the particular details of construction which have been described, but various modifications may be made therein without departing from the spirit and scope of the invention. An example of such departure is shown in Figs. 6 and 7, wherein provision is made for drawing the pattern from the sand independent of the separation of the flask section from the drum. In this construction the drum is provided with recesses 31 into which patterns 32 may travel through stripping plates 33, the latter being secured to the drum 10 in place of the pattern plates 12 of the other construction. Each of the patterns is carried on a rod 34 which slidably passes through a bearing provided for it in the drum and has its end connected by means of a link 35 with a crank arm 36 on a shaft 37, which is journaled at the end of a frame 38 containing a guide bearing 39 for the rod 34. The end of shaft 37 has a pair of trip arms 40, which, in the travel of the drum, are adapted to engage pins 41 and 42, the former serving to cause the shaft to turn in the direction to draw the pattern 32 through the stripping plate 33 into the recess 31, and the latter serving to return the pattern to its normal position. The pins 41 and 42 are desirably mounted on arms 43 projecting from one of the standards 11'. The operation of this construction is the same as the other, except that the pattern is quickly withdrawn from the sand with a straight line movement instead of being gradually tilted away from the sand as when the separation of the flask sections from the drum is relied upon.

What I claim as new and desire to secure by Letters Patent, is:

1. A molding machine, comprising a rotary member, patterns carried thereby, flask sections attached to the rotary member, a sand hopper in the path of the flask sections for filling them with sand, means for compressing the sand within the flask sections, and a bearing surface diverging from the rotary member upon which the flask sections are delivered by the rotary member.

2. A molding machine, comprising a rotary drum, patterns carried thereby, flask sections attached to the rotary drum, a sand hopper in the path of the flask sections for filling them with sand, means for delivering bottom plates to the flask sections, and a cam engaged by the bottom plates for forcing them against the sand to compress the sand around the patterns, said cam receding from the rotary drum to permit of the flask sections traveling out of connection with the drum.

3. A molding machine, comprising a drum, flask sections attached to the drum, a sand spout, a sand hopper pivotally connected with the sand spout, a spring bearing on the sand hopper for holding it in contact with the flask sections in their travel with the drum, and a guard pivotally mounted on the hopper and riding on the flask sections to confine the sand during the movements of the hopper.

4. A molding machine, comprising a rotary drum, patterns thereon, flask sections attached to the drum, means for filling the flask sections with sand, a hopper, bottom plates contained within the hopper, lugs on the bottom plates to engage the edges of the flask sections, means for releasing the bottom plates from the hopper, and means for forcing the bottom plates within the flask sections to compress the sand around the patterns.

5. A molding machine, comprising a rotary drum, patterns carried thereby, flask sections attached to the drum, means for filling the flask sections with sand, a hopper, bottom plates contained within the hopper, lugs at one side of the bottom of the hopper engaging the lowermost bottom plate, a spring catch at the other side of the bottom of the hopper also engaging the lowermost bottom plate, a lever on the hopper engaging the catch, a projection on each flask section for engaging the lever and causing it to release the catch and permit a bottom plate to fall on the sand of a flask section, and means for forcing the bottom plates into the flask sections to compress the sand around the patterns.

6. A molding machine, comprising a rotary drum, rods slidable thereon, patterns carried by the rods, stripping plates through which the patterns project, crank arms carried by the drum and connected with the rods, and means in the path of the crank arms for causing the crank arms to turn and thereby move the patterns through the stripping plates, flask sections attached to the drum, means for filling the flask sections with sand, and means for compressing the sand around the patterns.

In testimony whereof, I affix my signature, in presence of two witnesses.

ERNEST F. THIEMANN.

Witnesses:
R. S. C. CALDWELL,
CLARA V. MUEHLBACH.

---

Copies of this patent may be obtained for five cents each, by addressing the "Commissioner of Patents, Washington, D. C."